US008813166B2

(12) United States Patent
Howarter et al.

(10) Patent No.: US 8,813,166 B2
(45) Date of Patent: Aug. 19, 2014

(54) SYSTEM AND METHOD FOR TRANSFERRING A PARTIALLY VIEWED MEDIA CONTENT FILE

(75) Inventors: Jamie Howarter, Overland Park, KS (US); Doug Ceballos, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 395 days.

(21) Appl. No.: 12/335,180

(22) Filed: Dec. 15, 2008

(65) Prior Publication Data

US 2010/0154021 A1    Jun. 17, 2010

(51) Int. Cl.
*H04N 7/16*    (2011.01)

(52) U.S. Cl.
USPC ........................................................ 725/153

(58) Field of Classification Search
CPC .......................... H04N 21/4126; H04N 5/4401
USPC ................................................. 725/71, 141
See application file for complete search history.

(56) References Cited

U.S. PATENT DOCUMENTS

| | | | | |
|---|---|---|---|---|
| 7,502,545 | B2* | 3/2009 | Affaki | 386/248 |
| 2004/0244061 | A1* | 12/2004 | Okuyama et al. | 725/142 |
| 2007/0067808 | A1* | 3/2007 | DaCosta | 725/62 |
| 2007/0157260 | A1* | 7/2007 | Walker | 725/86 |
| 2007/0189711 | A1* | 8/2007 | Ash et al. | 386/83 |
| 2008/0126919 | A1* | 5/2008 | Uskali et al. | 715/200 |
| 2008/0267591 | A1* | 10/2008 | Wachtfogel et al. | 386/124 |
| 2009/0228922 | A1* | 9/2009 | Haj-khalil et al. | 725/38 |
| 2009/0232481 | A1* | 9/2009 | Baalbergen et al. | 386/124 |
| 2009/0298485 | A1* | 12/2009 | Lee et al. | 455/414.3 |

* cited by examiner

*Primary Examiner* — Nathan Flynn
*Assistant Examiner* — Alfonso Castro
(74) *Attorney, Agent, or Firm* — Swanson & Bratschun, L.L.C.

(57) ABSTRACT

Embodiments of the disclosed invention include a system and a method for transferring a partially viewed media content file from a digital video recorder to a mobile device. In one embodiment, the method transfers only a remaining portion of a partially viewed media content file to the mobile device. In other embodiments, the method may transfer the entire partially viewed media content file with an indicator of the current viewing point of the partially viewed media content file. The indicator enables the mobile device to begin playing of the partially viewed media content file starting at the current viewing point.

16 Claims, 4 Drawing Sheets

SYSTEM AND METHOD FOR TRANSFERRING A PARTIALLY VIEWED MEDIA CONTENT FILE

BACKGROUND

A set-top box (STB) is a device that connects a television to an external signal source. The set-top box decodes the signal into content which is then displayed on the television screen. Many of today's set-top boxes are also digital video recorders (DVRs). A digital video recorder (DVR) is a device that records video in a digital format to a disk drive or other memory medium within a device. Additionally, some DVRs enable a user to transfer a recorded show to personal computer. However, current methods for transferring stored media content files from a set-top box/digital video recorder lack features and desired by consumers.

SUMMARY

Embodiments of the disclosed invention include a system and a method for transferring a partially viewed media content file from a digital video recorder to a mobile device. In one embodiment, the method includes receiving a request to transfer a remaining portion of the partially viewed media content file from the digital video recorder to the mobile device. In response to receiving the transfer request, the method determines a current viewing point of the partially viewed media content file, i.e., the beginning point of the unviewed portion of the media content file. The method transfers to the mobile device the remaining portion of the partially viewed media content file starting from the current viewing point.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented.

Embodiments of the disclosed invention include a system and a method for transferring a partially viewed media content file from a digital video recorder to a mobile device. For example, a user may be viewing a stored media content file of a digital video recorder device on a television and would like to continue viewing the stored media content file on a mobile device. In one embodiment, a method is disclosed for transferring only a remaining portion of a partially viewed media content file to the mobile device. In other embodiments, a method is disclosed the entire partially viewed media content file with an indicator of the current viewing point of the partially viewed media content file. The indicator enables the mobile device to begin playing of the partially viewed media content file starting at the current viewing point.

As referenced herein, a partially viewed media content file is a media content file that has begun playing, but has not completely finished. Additionally, as referenced herein, the term "transfer" and/or "transferring" means that the receiving device, e.g., a mobile device, receives and/or downloads the media content file into non-volatile memory, as opposed to receiving streaming media content.

Figure 1:
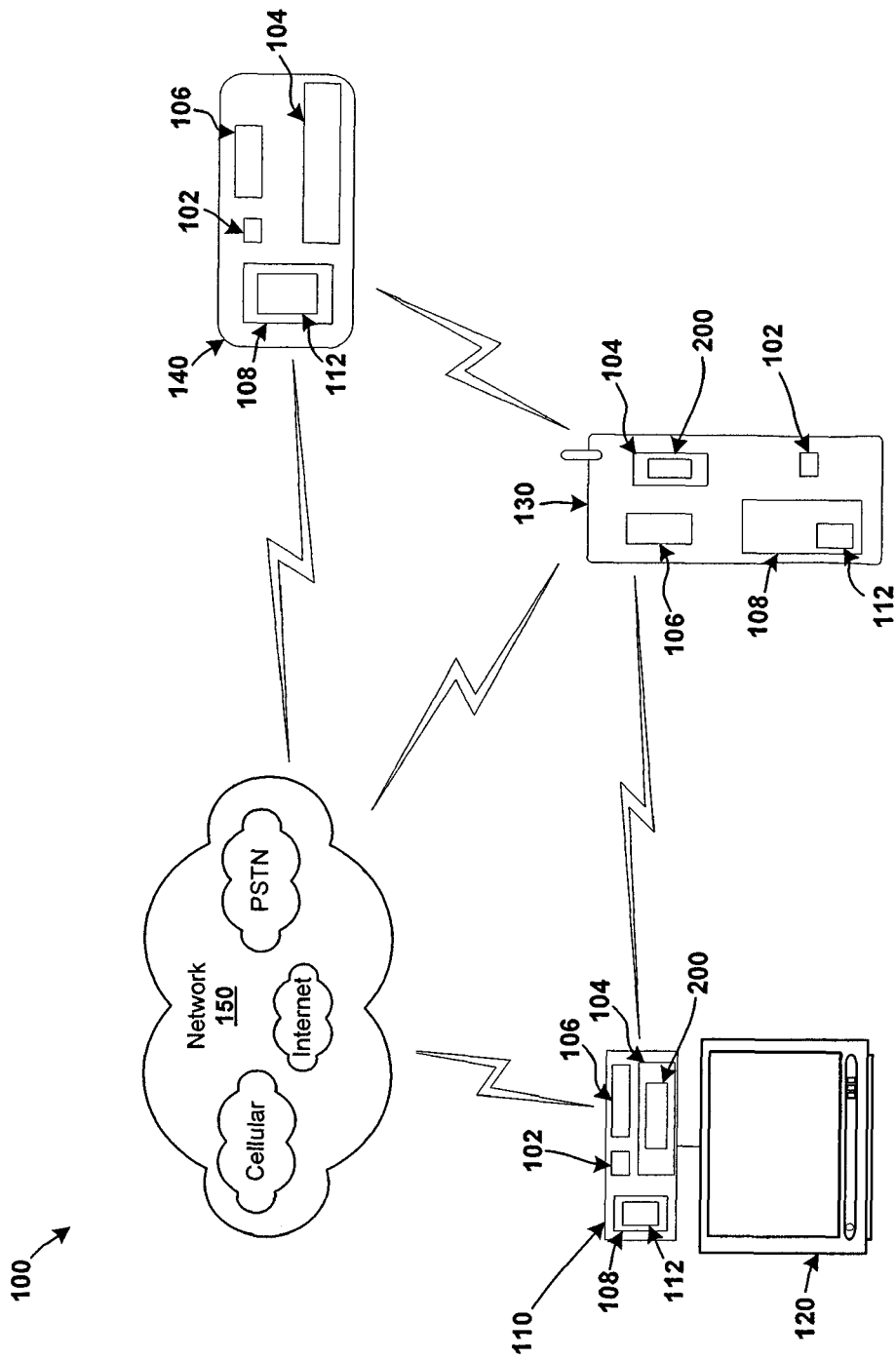
FIG. 1 depicts an embodiment of a network environment in which the illustrative embodiments may be implemented for transferring a media content file.

FIG. 1 depicts an embodiment of a network environment 100 in which the illustrative embodiments may be implemented for transferring a media content file from a digital video recorder to a mobile device. In the depicted embodiment, an electronic device, such as, but not limited to, set-top box 110, mobile device 130, and video playback device 140, comprises, at a minimum, a processing unit 102, a memory component 104, a communication interface 106, a data storage component 108, and media content files 112 stored in data storage component 108. In some embodiments, an electronic device, such as, but not limited to, mobile device 130, may include a display component for displaying images. Alternatively, or in addition to, an electronic device, such as, set-top box 110, may be coupled via wired or wireless means to a separate display unit, such as, but not limited to, display unit 120. Display unit 120 may be, but is not limited to, a television set, a computer monitor, and/or a projection screen.

Set-top box 110 is an electronic device that connects to a display unit and an external source of signal, turning the signal into displayable content on the display unit. In some embodiments, set-top box 110 may be a digital video recorder (DVR) capable of recording video in a digital format to a disk drive or other memory medium within the device.

Mobile device 130 is a hand-held computing and/or mobile communication device such as, but not limited to, a cellular phone, a laptop, a personal digital assistant (PDA), or a media player for a vehicle. In some embodiments, mobile device 130 may be used to communicate with other mobile devices and/or computing devices over network 150.

Video playback device 140 includes any device capable of playing a stored media content file. For example, in some embodiments, video playback device 140 may be, but is not limited to, a portable digital versatile disc (DVD) player, a data processing system, a set-top box, and/or a mobile device, including, but not limited to, an IPhone®, IPod®, a Blackberry® device, or another cellular telephone or personal digital assistant.

Processing unit 102 may comprise of one or more microprocessors for executing computer usable program code/instructions for transferring a media content file. For example, processing unit 202 may execute computer executable instructions associated with media content file transfer application 200 stored in memory component 104 for transferring a media content file from a digital video recorder to a mobile device. Memory component 104 is a data storage component that stores currently executing instructions and/or data utilized by an operating system, software program, hardware device, and/or other computer processes.

Communication interface 106 enables an electronic device to communicate and/or transfer data files over a network, such as, but not limited to, network 150. In some embodiments, communication interface 106 may be an Ethernet card, a telephone modem, a wireless transceiver, and/or a coaxial cable coupling. Alternatively, in some embodiments, network interface 106 may be an embedded component, i.e., part of the main circuit board/motherboard. In some embodiments, communication interface 106 of a first device, such as, set-top box 110 may establish a direct communication link with the communication interface 106 of a second device, such as, mobile device 130 for transferring data files directly to the second device. In some embodiments, the first device and the second device may be part of an hoc network. An ad hoc network is a decentralized network wherein each node is able to forward data to other nodes without using a middleware device, such as, a router.

In some embodiments, network 150 may include one or mote satellite and/or cable networks for receiving media content. Additionally, in some embodiments, network 150 may also include a cellular network, the public switched telephone network (PSTN), and the Internet for transferring data from a digital video recorder to a mobile device. In some embodiments, the cellular network may include a 3G network. 3G networks are wide-area cellular telephone networks that incorporate high-speed Internet access. In some embodiments, network 150 may also include a number of different types of data networks, such as, but not limited to, an intranet, a local area network (LAN), a wide area network (WAN) and wireless local area network (WLAN) networks.

Data storage component 108 is a non-volatile memory component of an electronic device, such as, but not limited to, a hard disk drive. Non-volatile memory retains stored data when power is loss. In one embodiment, data storage component 108 stores media content files 112. Media content files 112 comprises one or more media files, such as, but not limited to, a video and/or an audio file. For example, media content files 112 may include television shows and/or movies that were recorded using set-top box 110. In one embodiment, media content files 112 may be shared between one or more electronic devices utilizing software installed on each device, such as, but not limited to, media content file transfer application 200.

Figure 2:
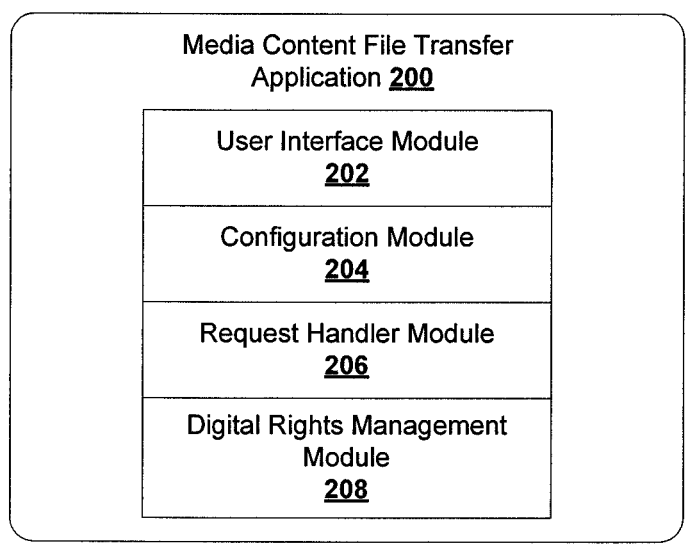
FIG. 2 depicts an embodiment of a media content file transfer application in accordance with the illustrative embodiments.

FIG. 2 depicts an embodiment of a media content file transfer application 200 in accordance with the illustrative embodiments. In one embodiment, media content file transfer application 200 may be executed by a processing unit, such as processing unit 102, located on a first device, i.e., a transferring device. In some embodiments, media content file transfer application 200 may also be executed by a processing unit on a second device, i.e., a receiving device. In one embodiment, media content file transfer application 200 includes a user interface module 202, a configuration module 204, a request handler module 206, and a digital rights management module 208.

In one embodiment, user interface module 202 comprises computer executable instruction code for presenting a user interface on a display component associated with an electronic device for transferring a stored media content file. For instance, in one embodiment, in response to receiving a user initiated request to transfer a currently viewing media content file, user interface module 202 presents a user interface for selecting one or more destination devices to transfer the remaining unviewed portion of the currently viewed stored media content file. In some embodiments, user interface module 202 may also present a user interface for selecting a stored media content file that is not currently being viewed. For example, in some embodiments, mobile device 130 may request a list of media content files located on set-top box 110. In these embodiments, user interface module 202 may present a list of media content files on the display of mobile device 130 for initiating a request to transfer a media content file to mobile device 130.

In one embodiment, configuration module 204 comprises computer executable instruction code for configuring media content file transfer application 200. For example, in some embodiments, configuration module 204 may be use to configure a communication protocol for the transferring of media content files. In some embodiments, the communication protocol may be a network protocol and/or a protocol for establishing a direct communication link with one or more other devices. For instance, in some embodiments, a user may configure media content file transfer application 200 to transmit a partially viewed media content file using the short message service (SMS) communication protocol. In some embodiments, configuration module 204 may enable a user to specify a media access control (MAC) address and/or a mobile identification number (MIN) for communicating with a particular device.

Additionally, in some embodiments, configuration module 204 may enable a user to customize options associated with the transferring a partially viewed media content file. For example, in some embodiments, the user may configure an option to transfer only the remaining/unviewed portion of a partially viewed media content file. A user may prefer this option to save data storage space and/or to decrease transfer time. In some embodiments, a user may also specify an additional buffer containing a viewed portion of the partially viewed media content file to enable the user to recall the events leading up to the remaining portion of a partially viewed media content file. For example, a user may specify that the last five minutes a viewed content be appended to the remaining portion of the partially viewed media content file. Alternatively, in some embodiments, media content file transfer application 200 may automatically append an additional buffer to the beginning of the remaining/unviewed portion of a partially viewed media content file.

Further, in some embodiments, configuration module 204 may enable a user to select and transfer the entire partially viewed media content file. In these embodiments, media content file transfer application 200 may provide an indicator that identifies a current viewing point of the selected partially viewed media content file. Set-top box 110 transfers the indicator along with the entire partially viewed media content file to mobile device 130. The indicator, when detected by media content file transfer application 200 on mobile device 130, enables mobile device 130 to initiate playing of the partially viewed media content file starting at the current viewing point.

In one embodiment, request handler module 206 comprises computer executable instruction code for handling a request to transfer a partially viewed media content file. For example, in one embodiment, in response to receiving a push request to transfer a partially viewed media content file, e.g., one that is currently being played, request handler module 206 determines a current viewing point of the media content file. A push request is a request to send data to another program and/or device when the other device has not requested the data. In some embodiments, request handler module 206 presents a list of preconfigured devices to which the remaining portion of the partially viewed media content file may be transferred. Additionally, in some embodiments, depending on a selected transfer device, request handler module 206 may convert and/or format the remaining portion of the partially viewed media content file into a suitable and/or preferred file format and/or size. In addition, as previously described, in some embodiments, request handler module 206 may append an additional buffer of viewed media content to the remaining portion of the partially viewed media content file to enable a user to refresh his memory. In some embodiments, an additional buffer may be necessitated by the data file format of the partially viewed media content file, i.e., it may not be possible to start exactly at a current view point. In these embodiments, request handler module 206 may start at the closet possible point prior to the current view point.

Additionally, in some embodiments, request handler module 206 may receive a pull request from another device for a particular media content file. A pull request is a data request initiated by another program and/or device. In these embodiments, request handler module 206 may retrieve and transfer a selected partially viewed media content file in the same or similar manner as described above for a push request.

In one embodiment, media content file transfer application 200 includes digital rights management module 208. In one embodiment, digital rights management module 208 comprises computer executable instruction code for limiting/controlling access to a particular instance/copy of a media content file. For example, an issuer of a media content file can limit the number of viewings, copies, and/or devices the media content file can be transferred to. In some embodiments, digital rights management module 208 handles encrypting and decrypting media content files. For example, in some embodiments, digital rights management module 208 may encrypt a media content file on a set-top box 110 and transmits the encrypted media content file to mobile device 130. In some embodiments, mobile device 130 uses a decryption key located on the mobile device 130 to decrypt the media content file. Thus, digital rights management module 208 may limit unauthorized access to a particular media content file.

Figure 3:
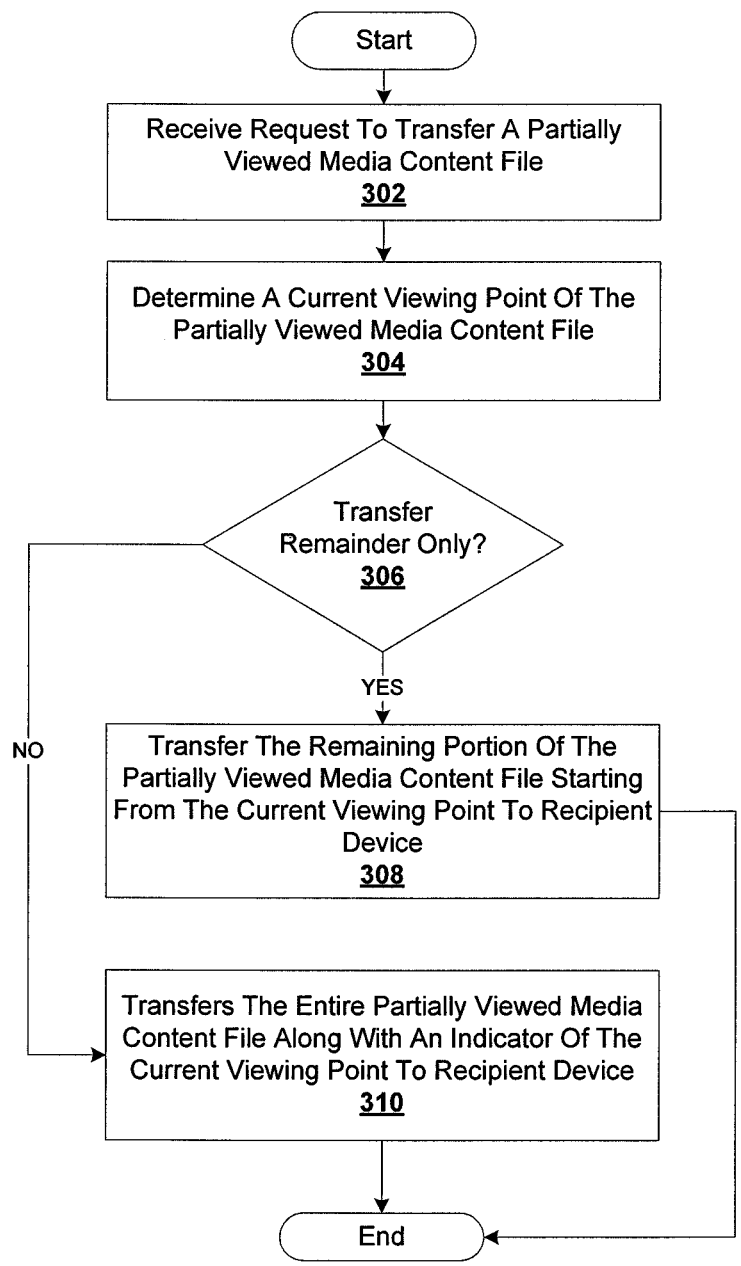
FIG. 3 depicts an embodiment of a process for transferring a partially viewed media content file in accordance with the illustrative embodiments.

With reference now to FIG. 3, process 300 depicts an embodiment of a method for transferring a partially viewed media content file. Process 300 may be executed by a processing unit, such as, processing unit 102, located on an electronic device, such as, but not limited to, set-top box 110. Process 300 begins by receiving a request to transfer a partially viewed media content file at step 302. In some embodiments, the partially viewed media content file is a currently playing media content file on set-top box 110. In other embodiments, the partially viewed media content file may be selected from a list of stored media content files on set-top box 110. Additionally, in some embodiments, the transfer request may be initiated by a user using set-top box 110 or may be initiated by a user using mobile device 130, i.e., a recipient device.

Process 300 determines a current viewing point of the partially viewed media content file at step 304. At step 306, the process determines whether to transfer only the remaining/unviewed portion of the partially viewed media content file. For instance, in some embodiments, a user may be presented with a user interface for selecting this option. In other embodiments, the process may check a configuration file to determine a user specified preference. If the process determines that only the remaining portion of the partially viewed media content file is to be transferred, the process, at step 308, transfers the remaining portion of the partially viewed media content file starting from the current viewing point to the recipient device, with process 300 terminating afterwards. However, if the process determines that the entire partially viewed media content file is to be transferred, the process, at step 310, transfers the entire partially viewed media content file along with an indicator of the current viewing point to the recipient device, with process 300 terminating afterwards. Additionally, in some embodiments, process 300 may encrypt the partially viewed media content file with a digital rights management encryption key before transferring the partially viewed media content file to the recipient device.

Figure 4:
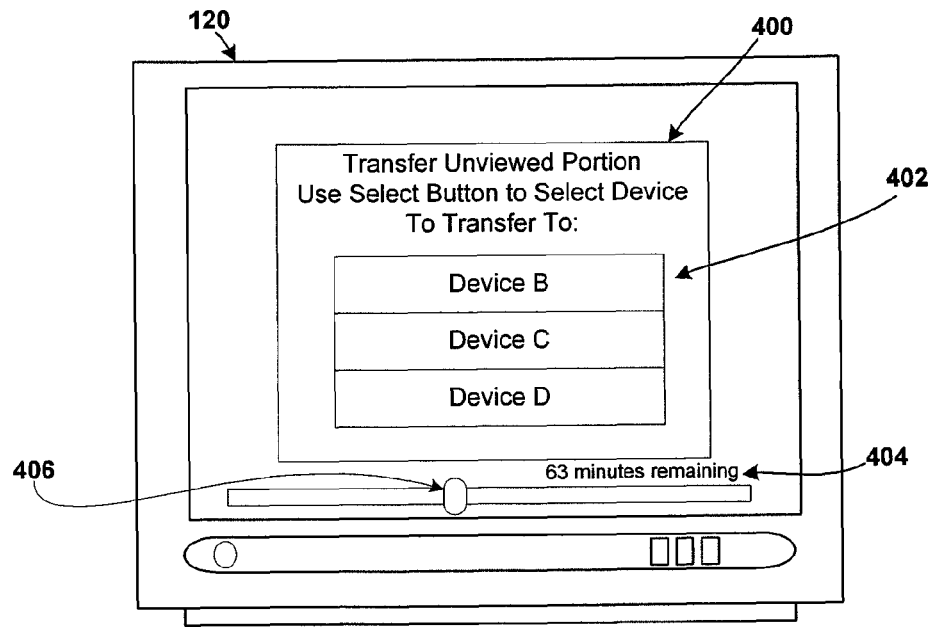
FIG. 4 depicts an embodiment of a user interface for transferring a media content file from a digital video recorder to a mobile device in accordance with the illustrative embodiments.

FIG. 4 depicts an embodiment of a user interface for transferring a media content file from a digital video recorder to a mobile device in accordance with the illustrative embodiments. In the depicted embodiment, a user may request that a remaining portion of a partially viewed media content file, e.g., one that was currently being played on display unit 120, be transferred/pushed to mobile device 130. For example, in some embodiments, user interface 400 may display a list 402 of a plurality of devices pre-configured to receive data from set-top box 110. In some embodiments, display unit 120 may also provide an approximate remaining time 404 and a current viewing point 406 associated with a requested media content file.

Figure 5:
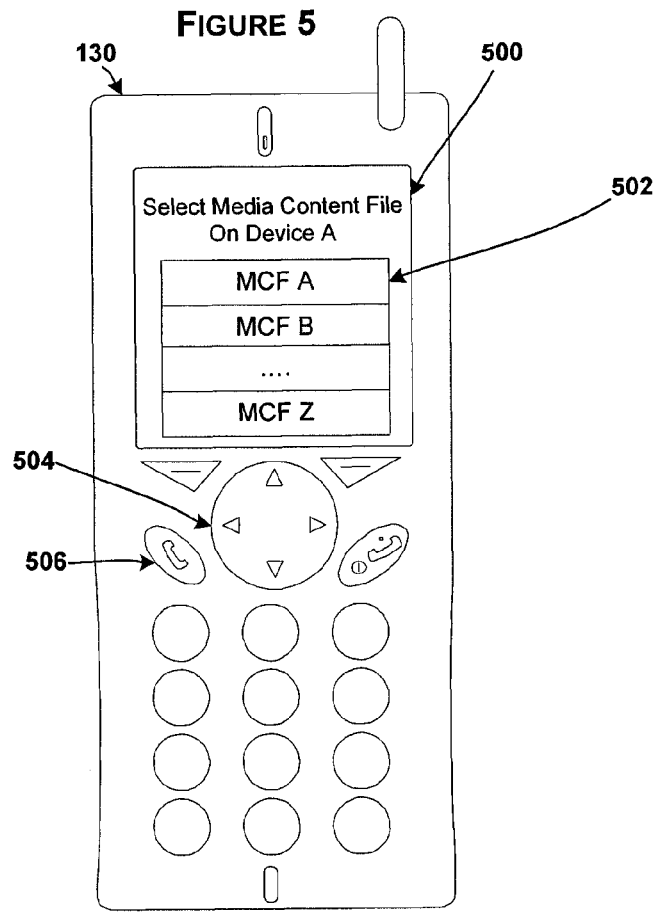
FIG. 5 depicts another embodiment of a user interface for requesting transfer of a media content file from a digital video recorder to a mobile device in accordance with the illustrative embodiments.

FIG. 5 depicts another embodiment of a user interface 500 for requesting transfer of a media content file from a digital video recorder to a mobile device in accordance with the illustrative embodiments. In the depicted embodiment, mobile device 130 is requesting/pulling a media content file from set-top box 110. In one embodiment, user interface 500 displays a list 502 of available media content files located on set-top box 110. In some embodiments, a user may use navigation button 504 and/or some other button associated with mobile device 130 to scroll list 502. In one embodiment, a user may send the request to set-top box 110 using call button 506. For example, in one embodiment, mobile device 130 transmits a SMS request to set-top box 110 that includes the necessary information, such as, but not limited to, the requested media content file and the contact data, such as, but not limited to, a mobile identification number and/or IP/network address, associated with mobile device 130.

Accordingly, embodiments of the disclosed invention include a system and a method for transferring a partially viewed media content file from a digital video recorder to a mobile device. In one embodiment, the method transfers only a remaining portion of a partially viewed media content file to the mobile device. In other embodiments, the method may transfer the entire partially viewed media content file with an indicator of the current viewing point of the media content file. The indicator enables the receiving device to begin playing of the partially viewed media content file starting at the current viewing point.

Additionally, in some embodiments, mobile device 130 may transfer the partially viewed media content file or a portion thereof, to a third device and/or back to set-top box 110. For instance, a user may start viewing a media content file stored on set-top box 110 at a first location (e.g., at home), transfer the remaining portion to mobile device 130 and continue to view the remaining media content file on mobile device 130 while traveling to a second location (e.g., while waiting at the airport), and then transfer the remaining/unviewed portion of the media content file to a different set-top box for viewing on a larger display unit at the second location (e.g., a hotel room).

As will be appreciated by one skilled in the art, the disclosed embodiments may be embodied as a system, method, or computer program product. Accordingly, the disclosed embodiments may be implemented using hardware, software (including firmware, resident software, micro-code, etc.), or an embodiment combining software and hardware aspects that may all generally be referred to herein as a "circuit," "module" or "system." Furthermore, the disclosed embodiments may take the form of a computer program product embodied in any tangible medium of expression having computer-usable program code embodied in the medium.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

We claim:

1. A computer implemented method for transferring a partially viewed media content file from a digital video recorder to a mobile device, the computer implemented method comprising:

receiving, using a processor, from a user, a request to transfer a remaining portion of the partially viewed media content file from the digital video recorder to a non-volatile memory of a mobile device, wherein the remaining portion of a partially viewed media content file comprises less than the entire media content file;

displaying, using the processor, a user interface on a display unit associated with the digital video recorder to enable the user to select the mobile device from a plurality of devices pre-configured to receive data from the digital video recorder and further to enable the user to specify a duration of an additional buffer containing a last viewed portion of the partially viewed media content file;

determining, using the processor, a current viewing point of the partially viewed media content file; and transferring, using the processor, to the mobile device a partially viewed media content file comprising;
   a last viewed portion of the partially viewed media content file, the last viewed portion having a specified duration selected by the user using the user interface; and
   the remaining portion of the partially viewed media content file starting from the current viewing point, wherein the last viewed portion is appended to the remaining portion of the media content file, and the data transferred comprises less than the entire media content file.

2. The computer implemented method of claim 1, wherein the partially viewed media content file is a video file.

3. The computer implemented method of claim 1, wherein the mobile device is a cell phone.

4. The computer implemented method of claim 1, wherein the request to transfer the remaining portion of the partially viewed media content file from the digital video recorder to the mobile device is initiated using the mobile device.

5. The computer implemented method of claim 4, further comprising displaying a user interface on the mobile device to enable selection of the partially viewed media content file from a plurality of media content files stored on the digital video recorder.

6. The computer implemented method of claim 1, wherein the request to transfer the remaining portion of the partially viewed media content file from the digital video recorder to the mobile device is initiated using the digital video recorder.

7. The computer implemented method of claim 1, further comprising using an SMS protocol to transfer the remaining portion of the partially viewed media content file to the mobile device.

8. The computer implemented method of claim 1, further comprising transferring the remaining portion of the partially viewed media content file from the digital video recorder to the mobile device over a direct wireless connection.

9. The computer implemented method of claim 1, further comprising encrypting the remaining portion of the partially viewed media content file using a digital rights management encryption key.

10. The computer implemented method of claim 1, further comprising:
   receiving a request to transfer a second remaining portion of the partially viewed media content file from the mobile device to a third device;
   determining a second current viewing point of the partially viewed media content file; and
   transferring to the third device the second remaining portion of the partially viewed media content file starting from the second current viewing point.

11. The computer implemented method of claim 10, wherein the second remaining portion of the partially viewed media content file is smaller than the remaining portion of the partially viewed media content file.

12. The computer implemented method of claim 10, wherein the second remaining portion of the partially viewed media content file is the same size as the remaining portion of the partially viewed media content file.

13. The computer implemented method of claim 10, wherein the third device is the digital video recorder.

14. A digital video recorder comprising:
   memory for storing computer usable program code;
   a processing unit in communication with the memory, wherein the processing unit executes the computer usable program code to:
      receive a request from a user to transfer a remaining portion of a partially viewed media content file from the digital video recorder to a non-volatile memory of a mobile device, wherein the remaining portion of a partially viewed media content file comprises less than the entire media content file;
      display a user interface on a display unit associated with the digital video recorder to enable the user to select the mobile device from a plurality of devices preconfigured to receive data from the digital video recorder and further to enable the user to specify a duration of an additional buffer containing a last viewed portion of the partially viewed media content file;
      determine a current viewing point of the partially viewed media content file; and
      transfer to the mobile device a partially viewed media content file comprising;
         a last viewed portion of the partially viewed media content file, the last viewed portion having a specified duration selected by the user using the user interface; and
         the remaining portion of the partially viewed media content file starting from the current viewing point, wherein the last viewed portion is appended to the remaining portion of the media content file, and the data transferred comprises less than the entire media content file.

15. The digital video recorder of claim 14, wherein the remaining portion of the partially viewed media content file is completely downloaded by the digital video recorder prior to transferring the remaining portion of the partially viewed media content file to the mobile device.

16. The digital video recorder of claim 14, wherein the request is initiated by the mobile device.

* * * * *